United States Patent
Gerrish

(10) Patent No.: US 10,206,324 B2
(45) Date of Patent: Feb. 19, 2019

(54) AUTONOMOUS AGRICULTURAL ROBOT (AGBOT) FOR DECISION MAKING AND COURSES OF ACTION CONSIDERING REAL-TIME CONDITIONS

(71) Applicant: Steven R. Gerrish, Crawfordsville, IN (US)

(72) Inventor: Steven R. Gerrish, Crawfordsville, IN (US)

( * ) Notice: Subject to any disclaimer, the term of this patent is extended or adjusted under 35 U.S.C. 154(b) by 0 days.

(21) Appl. No.: 15/455,958

(22) Filed: Mar. 10, 2017

(65) Prior Publication Data

US 2017/0261986 A1    Sep. 14, 2017

Related U.S. Application Data

(60) Provisional application No. 62/306,920, filed on Mar. 11, 2016.

(51) Int. Cl.
| | |
|---|---|
| *A01B 69/04* | (2006.01) |
| *G05D 1/02* | (2006.01) |
| *G06Q 10/06* | (2012.01) |

(52) U.S. Cl.
CPC .......... *A01B 69/008* (2013.01); *G05D 1/0282* (2013.01); *G06Q 10/06* (2013.01); *G05D 2201/0201* (2013.01)

(58) Field of Classification Search
USPC ............................................................. 701/2
See application file for complete search history.

(56) References Cited

U.S. PATENT DOCUMENTS

| | | | | |
|---|---|---|---|---|
| 2003/0229435 | A1* | 12/2003 | Van der Lely | A01B 79/00 701/50 |
| 2007/0271002 | A1* | 11/2007 | Hoskinson | G06Q 10/06 700/245 |
| 2013/0325242 | A1* | 12/2013 | Cavender-Bares | A01C 21/002 701/25 |
| 2015/0319913 | A1* | 11/2015 | Foster | A01B 69/00 701/26 |
| 2017/0021011 | A1 | 1/2017 | Kovarik et al. | |
| 2017/0031149 | A1 | 2/2017 | Levin et al. | |
| 2017/0035052 | A1 | 2/2017 | Becker | |

OTHER PUBLICATIONS

CBRNE World Staff; FLIR Announces Mobile Griffin G465 Gas Chromatograph-Mass Spectrometer for Chemical Threat ID; http://cbrneworld.com/news/flir_announces_mobile_griffin_g465_gas_chromatograph_mass_spectrometer_for#axzz4avSBOZav Nov. 1, 2016.
Jones et al.; Top 10 Plant-parasitic nematodes in molecular plant pathology; Molecular Plant Pathology; 2013 14 (9), 946-961.
Rich et al.; Introduction to Plant Parasitic Nematodes and Their Management; University of Florida; 50 pages, 2013.
Gerald Pilger; The next big disruption in agriculture;Country Guide; May 8, 2017, 10 pages.
Lambert et al.; Introduction to Plant-Parasitic Nematodes; The Plant Health Instructor; University of Illinois; 2002, revised 2009, 17 pages.

* cited by examiner

*Primary Examiner* — Tyler D Paige
(74) *Attorney, Agent, or Firm* — Barnes & Thornburg LLP

(57) ABSTRACT

An autonomous agricultural system receives weather information and determines preferred courses of action based on the information received.

14 Claims, 1 Drawing Sheet

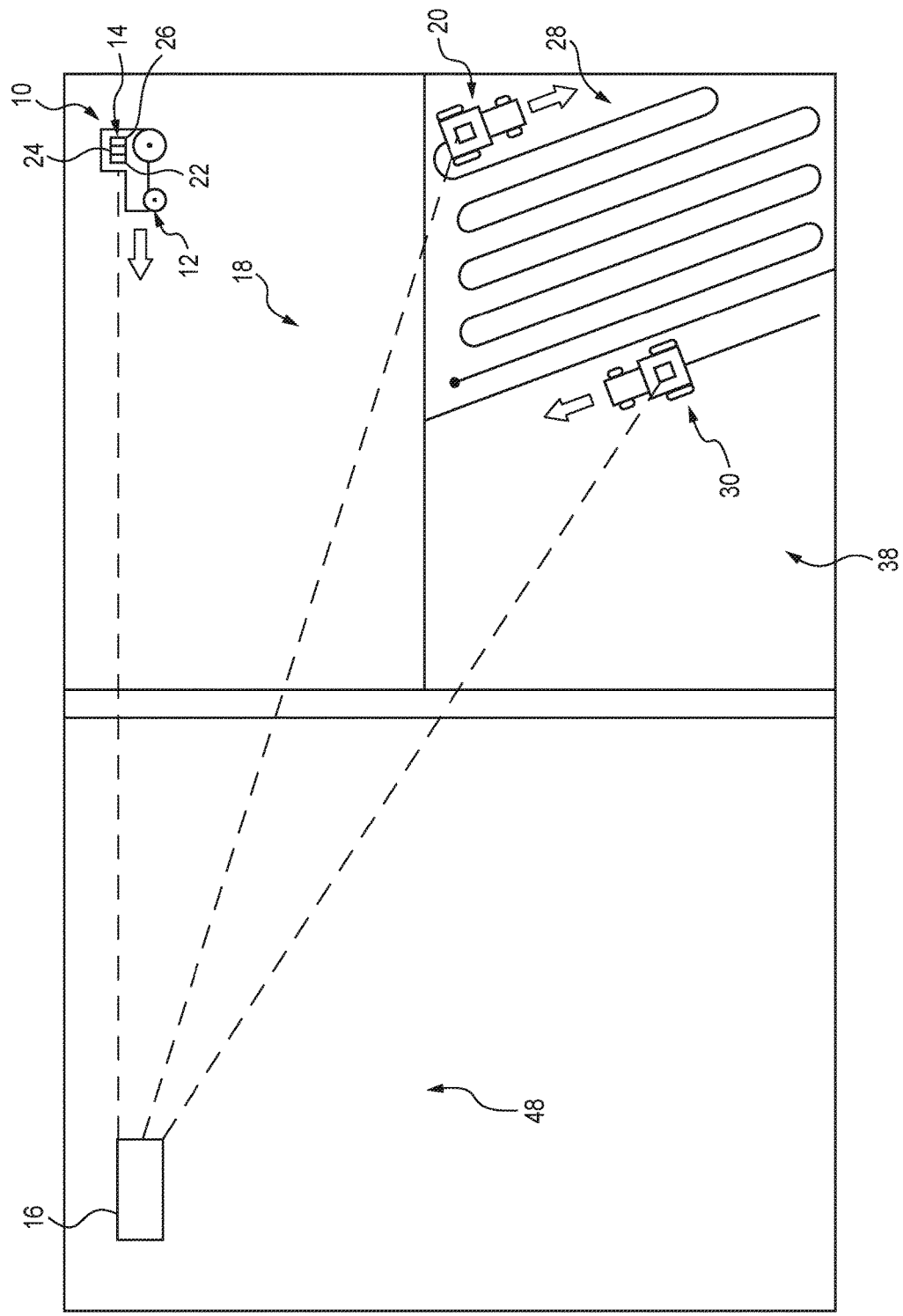

AUTONOMOUS AGRICULTURAL ROBOT (AGBOT) FOR DECISION MAKING AND COURSES OF ACTION CONSIDERING REAL-TIME CONDITIONS

CROSS-REFERENCE TO RELATED APPLICATION

The present application claims the benefit of U.S. Provisional Application No. 62/306,920, filed Mar. 11, 2016, the contents of which are incorporated herein by reference in their entirety.

BACKGROUND

The present disclosure relates generally to devices, systems, and methods of agricultural, and more specifically to the devices, systems, and methods of autonomous agricultural.

Autonomous agricultural machines, such as autonomous tractors, often operate across vast distances far from resources, covered facilities, and/or other infrastructure. Appropriate operation requires consideration of current and impending conditions.

SUMMARY

The present disclosure may comprise one or more of the following features and combinations thereof.

According to an aspect of the present disclosure, an autonomous agricultural system for considering real-time conditions may include a machine chassis configured for driven motion by a motor, and an autonomous machine control system for operating the machine chassis to perform agricultural operation independent of occupant operation. The autonomous control system may be in communication and receive real-time weather information. The autonomous machine control system may determine a preferred course of action based on the weather information received and/or based on at least one of a field completion time, a predicted amount of time before a rain event, a down time probability, and resource needs.

In some embodiments, the preferred course of action may include at least one of stopping operation, traveling to a secure sight, refilling resources, moving to another field, and continuing agricultural operation. In some embodiments, the preferred course of action may include at least two options for operation and the autonomous machine control system may be configured to communicate the at least two options to a user interface for selection by a user. In some embodiments, the user interface may include at least one of a smartphone, tablet, or wearable electronic device.

In some embodiments, the user interface may include a display operable to present the user with the at least two options for selection. In some embodiments, the user interface may be configured to communicate a signal to the autonomous machine control system indicating a selection by the user of one of the at least two options. In some embodiments, the autonomous machine control system may operate the machine chassis according to the selection in response to receiving the signal. In some embodiments, an agricultural device may be mounted to the machine chassis and the autonomous machine control system may operate the agricultural device according to the weather information received and/or based on at least one of a field completion time, a predicted amount of time before a rain event, a down time probability, and resource needs. In some embodiments, the agricultural device may be at least one of a harvester, sorter, spreader, sprayer, cultivator, irrigator, and soil analyzer.

In some embodiments, the weather information may be received from at least one of a local source and a remote source. In some embodiments, the remote source includes at least one of a satellite and a ground-based broadcast system in communication with the autonomous machine control system over a network.

In some embodiments, at least one portion of the autonomous machine control system may be mounted on the machine chassis. In some embodiments, at least one portion of the autonomous machine control system may be arranged independently from the machine chassis. In some embodiments, the at least one portion of the autonomous machine control system may be arranged remotely from the machine chassis. In some embodiments, the at least one portion of the autonomous machine control system may be arranged locally relative to the machine chassis. In some embodiments, the real-time weather conditions may include at least one of present, future, and predicted weather conditions provided on a real-time basis.

According to another aspect of the present disclosure, a method of operating an autonomous agricultural system for development of an agricultural territory, may include acquiring information related to weather conditions near the agricultural territory, determining a preferred course of action based on the weather information received, and executing, via the autonomous agricultural machine, the preferred course of action.

In some embodiments, the preferred course of action may include at least two options for operation of the autonomous agricultural system and the method may further comprise presenting the at least two options on a user interface. In some embodiments, the method may include receiving a communication indicating a selection by a user of one of the at least two options. In some embodiments, executing the preferred course of action may include executing the selection of the one of the at least two options.

In some embodiments, the preferred course of action may include at least one of stopping operation, traveling to a secure sight, refilling resources, moving to another field, and continuing agricultural operation.

According to another aspect of the present disclosure an autonomous agricultural machine for considering real-time conditions may include a machine chassis configured for driven motion by a motor, an autonomous machine control system for operating the machine to perform agricultural operation independent of occupant operation, the autonomous control system in communication and receiving real-time weather information, wherein the autonomous machine control system determines a preferred course of action based on the weather information received and at least one of a field completion time, a predicted amount of time before a rain event, a down time probability, and resource needs.

In some embodiments, the preferred course of action may include at least one of stopping operation, traveling to a secure sight, refilling resources, moving to another field, and continuing agricultural operation.

These and other features of the present disclosure will become more apparent from the following description of the illustrative embodiments.

BRIEF DESCRIPTION OF THE DRAWINGS

FIG. 1 is a diagrammatic top plan view of an autonomous agricultural system for considering real time conditions showing that the system includes an agricultural machine in communication to consider weather information.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Agricultural machines (such as harvesters, planters, and spreaders) are preferably operated to avoid unsuitable weather conditions. For example, such machines may not operate well on soil that is too wet and/or in significant rain events in general. Moreover, it may be undesirable for machine reliability and/or life to operate under such weather conditions. Monitoring impending weather conditions can assist in making operational decisions.

The present disclosure includes autonomous agricultural devices, systems, and methods thereof which receive weather information and can determine and execute preferred operations in consideration of impending weather. In some embodiments, autonomous agricultural machines may independently determine and execute preferred operations, but in some embodiments, autonomous agricultural machines may determine and recommend preferred operations to a user (such as a farmer) for consideration and selection. As described herein, autonomous agricultural machines can consider actual operational parameters to determine preferred operations based on weather information.

An illustrative autonomous agricultural system including an autonomous agricultural machine 10 is shown in FIG. 1. The autonomous agricultural machine 10 illustratively includes a vehicle chassis 12 adapted to receive driven motion from a motor, and a control system 14 mounted to the chassis 12. The control system 14 illustratively operates the chassis 12 for agricultural operation, for example, seed planting, without active input by any operator of the machine 10.

The autonomous agricultural machine 10 is adapted to perform agricultural operation by detecting various conditions of its surroundings, for example, current position, the edges of a field, speed, elevation, pitch, obstacles, variation in terrain, and navigating the chassis 12 to negotiate the surroundings while performing its agricultural operation. Navigation of the chassis 12 illustratively includes any of steering, speed and/or throttle control, transmission control and/or other piloting controls (including vehicle specific controls as appropriate according to the embodiment, e.g., for aviation-based vehicles navigation may include flight controls such as position control (e.g., pitch, yaw, rotation, altitude) component control (e.g., flaps), and/or other vehicle-specific local guidance negotiation). For example, the autonomous agricultural machine 10 can determine and execute the most efficient route for planting seed and/or spreading fertilizing and/or pesticide for a given field in consideration of various conditions of its surroundings.

In the illustrative embodiment, the autonomous agricultural machine 10 is configured for communication with a central control station 16. The central control station 16 is illustratively embodied as an interface for a farmer to control and/or direct operation of the autonomous agricultural machine 10. The central control station 16 illustratively communicates real-time weather information to the autonomous agricultural machine 10. In some embodiments, the autonomous agricultural machine 10 may receive weather information directly from a satellite or other source and/or may communicate location information with a global positioning system (GPS). In the illustrative embodiment, the central control station 16 is a personal computing device having relatively fixed location, but in some embodiments, may be any suitable type of computing device such as a personal electronic device, a smart phone, a tablet, and/or a laptop computer.

The autonomous agricultural machine 10 is illustratively configured to determine preferred courses of action based on the weather information received and consideration of operational information. In the illustrative embodiment, operational information includes operational parameters such as the time required for the machine 10 to complete its agricultural operations for given row of a current field 18; the amount of time before an impending rain event; the probability of a downtime event (e.g., event requiring operations stop); resource needs (e.g., amount of seed, fertilizer, and/or pesticide on the machine 10) and/or other operations relevant parameters. The autonomous agricultural machine 10 illustratively determines the operational information based on the received weather information and/or detected conditions of its surroundings, for example, calculating times in consideration of soil moisture as a function of impending weather. In some embodiments, any one or more of weather information, operational information (including one or more of the operational parameters mentioned above), and other information may be considered in determining preferred courses of action.

The autonomous agricultural machine 10 illustratively determines preferred courses of action based on the weather information received and the operational information. The preferred courses of action can include any of stopping agricultural operation (e.g., in-place or nearby); traveling to a secure sight (e.g., storage facility); refilling resources; relocating to a different field; and/or continuing current operations. In some embodiments, the autonomous agricultural machine 10 may considered the options and determine and execute the preferred option autonomously, but in some embodiments, the autonomous agricultural machine 10 may communicate the preferred courses of operation to the central control station 16 for selection by the farmer.

In determining whether to relocate to a different field, the autonomous agricultural machine 10 illustratively considers the weather information received and any of the current geographical location (e.g., GPS and/or coordinate location); the locations of other farms under the same management relative to the current location, the current and predicted soil conditions on the current farm and other farms. For example, if the time required to exit the current farm and relocate to another farm is not substantially less than the downtime required to stop operation and allow a rain storm to pass, the autonomous agricultural machine 10 determines the preferred option is to stop operation and allow the storm to pass. In determining whether to resume agricultural operations, for example, after a decision to stop operations, the autonomous agricultural machine 10 illustratively considers the current soil conditions, weather information, and/or ranking of the farmer's priorities.

In some embodiments, the autonomous agricultural machine 10 may present to the farmer determined probabilities and/or estimated times related to the preferred courses of operation. The autonomous agricultural machine 10 may present to the farmer for consideration a probability of completing the current agricultural operations, the available window of opportunity based on current field size, the current and predicted operated speed and/or other conditions of operation.

In the illustrative embodiment, the autonomous agricultural machine 10 is configured to perform agricultural operations and control as directed by the control system 14. The control system 14 is illustratively embodied as an onboard control system that includes a processor 22, a memory device 24, and communications circuitry 26 in communication with each other. The processor 22 illustratively executes instructions stored by the memory device 24 to determine and execute operation of autonomous agricultural machine 10. The communications circuitry 26 is configured to send and receive signals as dictated by the processor 22 to communicate with the central control station 16. The communications circuitry 26 illustratively includes various receivers and transmitters and other hardware and/or software components for conducting communications as described herein. The control system 14 is illustratively in communication with various sensors, cameras, and/or other devices of the autonomous agricultural machine 10 that detect the conditions of the surroundings for communication to the control system 14.

As shown in FIG. 1, the central control station 16 is illustratively located on another farm 48 that is under the same management as field 18. The central control station 16 is illustratively in communication with other autonomous agricultural machines 20, 30 on other respective fields 28, 38. The autonomous agricultural machines 10, 20, 30 are illustratively embodied as communicating with the central control station 16 on a similar platform as the JDLink™ Machine Monitoring platform as marketed by Deere and Company of Moline, Ill. In some embodiments, the autonomous agricultural machines 10, 20, 30 may be in communication with the central control station 16 by a number of suitable communications protocols and/or platforms.

In the illustrative embodiment, the autonomous agricultural machines 10, 20, 30 are embodied to receive weather information through commercially available weather services such as Accuweather™ as marketed by AccuWeather, Inc. and/or Dark Sky™ as marketed by The Dark Sky Company, LLC. In the illustrative embodiment, the control system 14 determines weather predictions based on the weather information received. In some embodiments, the weather predictions may be determined by the central control station 16 and/or by another source (e.g., a commercial weather service) and may be communicated to the autonomous agricultural machine 10 as weather information.

The central control system 16 illustratively comprises suitable hardware and/or software for conducting the operations disclosed, for example but without limitation, servers, databases, processors, memory devices, and communications circuitry. In the illustrative embodiment, the autonomous agricultural machine 10 receives communications from and/or through the central control system 16 as a communications hub. The central control system 16 is illustratively embodied as arranged locally relative to the autonomous agricultural machine 10 and/or the relevant territory (farm(s) and/or operational geography of the autonomous agricultural machine 10). In some embodiments, the central control system 16 may be relatively remotely from the autonomous agricultural machine 10 and/or the relevant territory, and/or may be partly or wholly movable (for example, in the case of a portable electronic device). In some embodiments, the central control system 16 may communicate with the autonomous agricultural machine 10 via a communications network.

In the illustrative embodiment, operation of the autonomous agricultural machine 10 is primarily conducted by the control system 14 mounted on the chassis 12, including determination of preferred courses of action. In some embodiments, the control system 14 may conduct operations in conjunction with control system components not mounted on the chassis 12, for example but without limitation, the central control system 16, as a collective control system. In some embodiments, operation of the autonomous agricultural machine 10 may be partly or wholly performed by local and/or remote control systems, not mounted on the chassis 12. For example, immediately local decision-making operations, for example but without limitation, steering and/or speed control relative to obstacles along the path of the machine 10 may be performed by the onboard control system 14 while global-decision making operations, for example but without limitation, determination of preferred courses of action may be performed by another control system, not onboard the machine 10, and communicated for execution to the control system 14. Collaborative control systems may partly or wholly share software and/or hardware components.

The present disclosure includes devices, systems, and methods for Agricultural decision-making dependent on weather events and conditions, for example, soil moisture and rain which can affect agricultural operations. The present disclosure includes using real-time data to provide intelligent solutions to the farmer or autonomous agricultural robots (agbots) for decision making and courses of action considering real time conditions.

Real-time weather events such as rain as well as minute-to-minute predictions of approaching rain can be received from information sources. The present disclosure includes devices, systems, and methods based on weather observations and/or predictions to allow for equipment (autonomous or manned) to have solution for operations based on current operating activities to be offered to the machine and/or operator.

The present disclosure includes devices, systems, and methods for agricultural decision-making dependent on weather events and conditions. Operational decisions may include operational-specific determinations. For example but without limitation, an autonomous agricultural machine configured for applying fertilizer and/or pesticide may be operated to vary the amounts of product distribution in consideration of weather, and/or an autonomous agricultural machine configured for harvesting (harvest agbot) may be operated in consideration of weather which may cause and/or predictively cause harvest (plant) material to adversely affect machine harvest e.g., cause changes in power consumption, effectiveness of shelling, threshing grain and/or plant material, wheel slippage and/or traction issues due to ground conditions. Another non-limiting example may include in-situ and/or portable sampling and/or analysis equipment mounted on the chassis 12 for conducting onboard analysis such as soil nutrient sampling, parasite and/or disease identification (e.g., parasitic nematodes, fungus, bacteria, and/or ailments) and/or associated diagnoses, control, and/or treatment operations. Operation of the sampling and analysis equipment may consider weather information (past, present, and/or future), for example but without limitation, in selecting timing, location, technique and/or other characteristics of sampling, analysis, and/or interpretation of data.

The present disclosure includes devices, systems, and method for autonomous agricultural system operation which may be applicable to a wide variety of agricultural machines, including but without limitation, harvesters, sorters, spreaders, sprayers, cultivators, tractors, loaders, and irrigators, including whether land, water, and/or air-based.

The present disclosure includes devices, systems, and methods for autonomous vehicle in-situ sampling, examination, and/or testing of macro flora/fauna, micro flora/fauna, minerals/elements, solution characteristics (e.g., pH, cation exchange capacity (CEC), solubility, saturation, etc.). Such devices, systems, and methods may enable precision soil microbiome management including, for example, identifying microscopic minerals, molecules, solute characteristics and organisms for onsite farm diagnostics and memorialization. Such devices, systems, and methods may determine, consider, implement and/or otherwise utilize one or more of factors including pre-planting conditions, growing condition changes, chemical alterations to micro flora/flauna, fertilizer alterations to micro flora/flauna, solute changes in micro flora/flauna, harvest changes to micro flora/flauna, cover crop changes to micro flora/flauna, and mineral extraction and application effects. Such factors may be used for yield management of crops and/or mass customized solutions for livestock and/or humans consuming crops. Genomics of the microbial and micro flora/flauna may be traced through the plant and/or livestock consumption to match the human gut micro flora of individual consumers.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An autonomous agricultural system for considering real-time conditions comprises:
    a machine chassis configured for driven motion by a motor, and
    an autonomous machine control system for operating the machine chassis to perform agricultural operation independent of occupant operation, the autonomous control system including a processor and being in communication and receiving real-time weather information,
    wherein the autonomous machine control system determines a preferred course of action based on the weather information received and at least one of a field completion time, a predicted amount of time before a rain event, a down time probability, and resource needs,
    wherein the preferred course of action includes at least two of stopping operation, traveling to a secure sight, refilling resources, moving to another field, and continuing agricultural operation, and the autonomous machine control system is configured to communicate the preferred course of action including at least two of stopping operation, traveling to a secure sight, refilling resources, moving to another field, and continuing agricultural operation as selectable options to a user interface for selection by a user.

2. The autonomous agricultural system of claim 1, wherein the user interface includes at least one of a smartphone, tablet, or wearable electronic device.

3. The autonomous agricultural system of claim 1, wherein the user interface includes a display operable to present the user with the at least two options for selection.

4. The autonomous agricultural system of claim 3, wherein the user interface is configured to communicate a signal to the autonomous machine control system indicating a selection by the user of one of the at least two options.

5. The autonomous agricultural system of claim 4, wherein the autonomous machine control system operates the machine chassis according to the selection in response to receiving the signal.

6. The autonomous agricultural system of claim 1, wherein the weather information is received from at least one of a local source and a remote source.

7. The autonomous agricultural system of claim 6, wherein the remote source includes at least one of a satellite and a ground-based broadcast system in communication with the autonomous machine control system over a network.

8. The autonomous agricultural system of claim 1, wherein at least one portion of the autonomous machine control system is mounted on the machine chassis.

9. The autonomous agricultural system of claim 1, wherein at least one portion of the autonomous machine control system is arranged independently from the machine chassis.

10. The autonomous agricultural system of claim 9, wherein the at least one portion of the autonomous machine control system is arranged remotely from the machine chassis.

11. The autonomous agricultural system of claim 9, wherein the at least one portion of the autonomous machine control system is arranged locally relative to the machine chassis.

12. The autonomous agricultural system of claim 1, wherein the real-time weather conditions include at least one of present, future, and predicted weather conditions provided on a real-time basis.

13. A method of operating an autonomous agricultural system for development of an agricultural territory, comprising:
    acquiring information related to weather conditions near the agricultural territory,
    determining, by a control system having a processor, a preferred course of action for an autonomous agricultural machine based on the weather information received, wherein the preferred course of action includes at least two of stopping operation, traveling to a secure sight, refilling resources, moving to another field, and continuing agricultural operation,
    communicating the preferred course of action including at least two of stopping operation, traveling to a secure sight, refilling resources, moving to another field, and continuing agricultural operation as options to a user interface for user selection, and
    executing, via the autonomous agricultural machine, the selected preferred course of action.

14. The method of claim 13, further comprising receiving a communication indicating a selection by a user of one of the at least two options.

* * * * *